(12) United States Patent
Crawford et al.

(10) Patent No.: US 7,704,599 B2
(45) Date of Patent: Apr. 27, 2010

(54) COATABLE COMPOSITIONS, COATINGS PREPARED THEREFROM, PROCESS AND LUMINESCENT COATED ARTICLES

(75) Inventors: Michael Karl Crawford, Glen Mills, PA (US); Kurt Richard Mikeska, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 185 days.

(21) Appl. No.: 11/749,780

(22) Filed: May 17, 2007

(65) Prior Publication Data

US 2008/0032143 A1 Feb. 7, 2008

Related U.S. Application Data

(60) Provisional application No. 60/834,477, filed on Jul. 31, 2006.

(51) Int. Cl.
*B32B 5/66* (2006.01)
(52) U.S. Cl. .................. 428/323; 428/328; 428/403; 428/404; 428/405; 428/406; 428/407
(58) Field of Classification Search .......... 428/323, 428/328, 403, 407
See application file for complete search history.

(56) References Cited

U.S. PATENT DOCUMENTS

| 6,576,155 B1 | 6/2003 | Barbera-Guillem |
| 6,861,012 B2 | 3/2005 | Gardner et al. |
| 2003/0032192 A1 | 2/2003 | Haubold et al. |

FOREIGN PATENT DOCUMENTS

| EP | 1728763 A2 | 12/2006 |
| EP | 1728763 A2 * | 12/2006 |
| WO | WO 03/052025 A1 | 6/2003 |
| WO | WO 2006/072849 A2 | 7/2006 |

OTHER PUBLICATIONS

Bensalah, A. et al., Synthesis and optical characterizations of undoped and rare-earth-doped CaF2 nanoparticles, Journal of Solid State Chemistry, 2006, p. 2636-2644, vol. 179, Elsevier, Inc.
Chemical Abstracts Service, Wojtowicz, A. J. et al., Scintillation mechanism in RE-activated fluorides, Journal of Luminescence, 1997, p. 72-74, 731-733, CODEN: JLUMA8; ISSN: 0022-2313.
Martin et al., Atomic Energy Levels—The Rare Earth Elements, U.S. Department of Commerce, National Bureau of Standards, 1978 (Book Not Included).
Wang et al., Synthesis and Luminescence Behavior of Eu3 + -Doped CaF2 Nanoparticles, Solid State Commun., 2005, vol. 133:775-779.
Dhopte et al., Luminescence in CaF2:Eu, Journal of Luminescence, 1992, vol. 54:95-101.
Gustafson et al., Trace Analysis of Lanthanides by Laser Excitation of Precipitates, Analytical Chemistry, 1979, vol. 51:1762-1774.
Doorn et al., Comparison of Calcium Fluoride and Lanthanum Fluoride As Host Lattices for the Determination of Lanthanides by Selective Excitation of Probe Ion Luminescence, Anal. Chem., 1985, vol. 57:2869-2873.
Bender et al., Synthesis and Fluorescence of Neodymium-Doped Barium Fluoride Nanoparticles, Chem. Mater., 2000, vol. 12:1969-1976.
Chaudhary et al., Optical Absorption & Thermoluminescence of Gd- and Sm-Doped CaF2 Single Crystals Irradiated With X-Rays, Indian Journal of Pure & Applied Physics. 1983, vol. 21:627-630.
Faulques et al., Synthesis, Fabrication, and Photoluminescence of CaF2 Doped With Rare Earth Ions, Journal of Fluorescence, 1998, vol. 8:283-287.
Cirillo-Penn et al., Laser Spectroscopic Measurement of Point-Defect Dynamics in Eu3+:CaF2, 1990, vol. 41:799-1307.
Hsu et al., Ultraviolet Response of CaF2:Tm Phosphor With Double Temperature Treatment, Radiation Protection Dosimetry, 1993, vol. 47:235-238.

* cited by examiner

*Primary Examiner*—Leszek Kiliman (57) ABSTRACT

The invention is directed to a composition having a carrier matrix, and a particulate luminescent composition dispersed therein, the particulate luminescent composition comprising a rare-earth-doped alkaline earth fluoride represented by the formula $$RE_xA_{1-x}F_{2+x-2y}O_y$$

wherein RE represents a three-valent rare-earth element, A is alkaline earth, $0.002 \leq x \leq 0.20$, and $0 \leq y \leq x$; the particulate luminescent composition exhibiting a luminescence spectrum having a plurality of intensity peaks at characteristic wavelengths. It is further directed to a process by contacting a surface with the composition and articles made therefrom.

30 Claims, 1 Drawing Sheet

FIG. 1

COATABLE COMPOSITIONS, COATINGS PREPARED THEREFROM, PROCESS AND LUMINESCENT COATED ARTICLES

FIELD OF THE INVENTION

The present invention is directed to coatable compositions such as inks, paints, etc, and luminescent coatings on an article prepared therefrom. The luminescent species is a rare-earth doped alkaline earth fluoride. The invention is useful for providing identifying marks on articles. Other uses include the preparation of phosphors for plasma displays.

BACKGROUND OF THE INVENTION

Luminescent rare-earth doped alkaline-earth fluorides have long been known, and have been employed for numerous purposes such as scintillation detectors and laser materials. $CaF_2$ doped with such rare-earth species as $Eu^{+3}$, $Er^{+3}$, $Tb^{+3}$ are well-known compositions. It is well-known that a rare-earth doped alkaline earth fluoride will exhibit luminescence when exposed to ultraviolet light.

Figure 1:
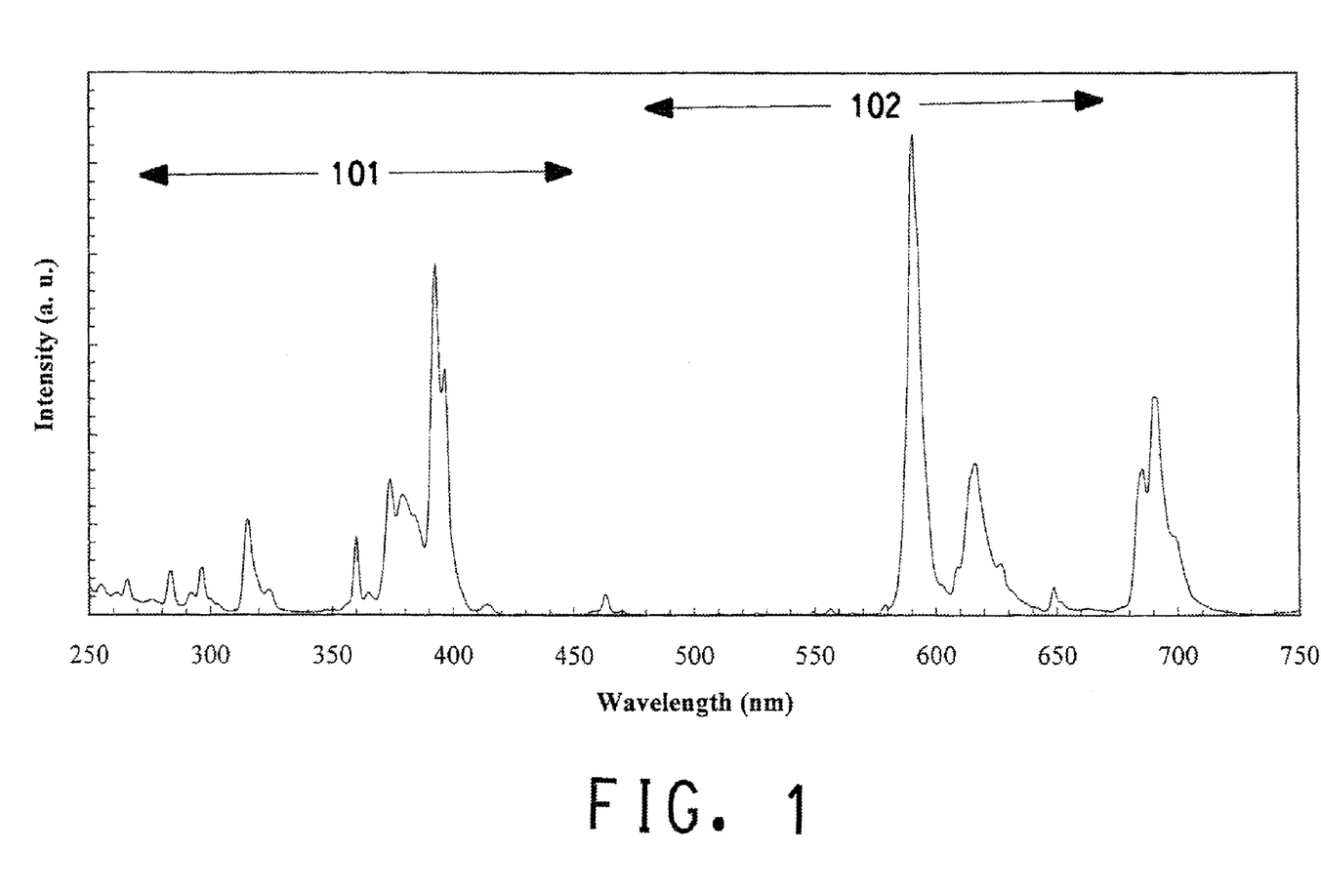
FIG. 1 is an excitation spectrum of $Eu_{0.05}Ca_{0.95}F_{2.05-2y}O_y$ observed at 592 nm and a luminescence spectrum of $Eu_{0.05}Ca_{0.95}F_{2.05-2y}O_y$ excited at 394 nm.

Each rare-earth element when incorporated into an alkaline earth host lattice such as $CaF_2$ exhibits a characteristic excitation spectrum; see, for example, FIG. 1 (101), and a characteristic emission or luminescence spectrum that depends upon the excitation wavelength employed; see, for example, FIG. 1 (102). The excitation spectrum is determined by monitoring the luminescence intensity at one wavelength while the specimen is illuminated over a range of wavelengths. The luminescence spectrum is determined by illuminating the specimen at a single wavelength corresponding to a peak in the excitation spectrum and determining the luminescence spectrum by scanning a detector over a range of wavelengths.

As shown in the figure, each such spectrum consists of a plurality of peaks at different wavelengths of light. The wavelengths at which the peaks occur are characteristic of each rare-earth element. No two rare-earth elements exhibit the same excitation or emission spectra; that is, the peaks in their spectra do not in general arise at the same wavelengths. To obtain luminescence, the rare-earth element must be excited by a light source that emits light at a wavelength corresponding to the location of one of the peaks in the excitation spectrum thereof. In general, the peaks in any one spectrum of rare-earth elements differ from one another in height or intensity, these differences in intensity being characteristic of the rare-earth element under particular conditions of measurement. These and related matters are all well-documented in the art. See for example, Martin et al., *Atomic Energy Levels—the Rare-Earth Elements*, U.S. Department of Commerce, National Bureau of Standards (1978).

Haubold et al., U.S. Published Patent Application 2003/0032192 discloses the use of doped luminescent inorganic compounds for marking goods, such as in use as so-called anti-theft or anti-counterfeiting security markers. Haubold et al., WO 03/052025 discloses printing but no details are provided. Rare-earth doped alkaline earth compositions are not disclosed by Haubold.

Wang et al., Solid State Commun., 133 pp. 775-779 (2005) discloses room temperature preparation of $CaF_2$ doped with 1-30 mol-% $Eu^{+3}$. Luminescence at 591 nm stimulated by illumination at 397 nm is described. 15% $Eu^{+3}$ is found to provide maximum emission intensity. No mention is made of heating the material.

It is known in the art that rare-earth-doped alkaline earth fluorides synthesized at temperatures below 100° C. exhibit a characteristic luminescence spectrum. See for example, Wang et al., op. cit.

Considerable effort is directed in the art towards developing compositions comprising luminescent rare-earth doped fluorides for use as identifying markers on commercial goods, including packages, manufactured articles, and even money. One high value application contemplated is in the area of security markers or anti-counterfeiting marks on goods. The idea is to place an identifying mark on a manufactured article that will attest to its authenticity. The mark is ideally invisible until inquiry is made using a particular wavelength of ultraviolet (UV) light which then stimulates the rare-earth doped fluoride to luminesce with a characteristic spectrum. The art does not disclose the use of rare-earth doped alkaline earth fluorides in coatings, inks and the like.

Security marks known in the art generally lack sufficient complexity or encryption which would make them difficult to counterfeit. The present invention provides a family of novel rare-earth-doped alkaline earth fluorides, and a process for preparing them, that are characterized by continuously variable luminescence peak intensity ratios, making it extraordinarily difficult to counterfeit.

SUMMARY OF THE INVENTION

The present invention provides a composition comprising a carrier matrix, and a particulate luminescent composition dispersed therein, the particulate luminescent composition comprising a rare-earth-doped alkaline earth fluoride represented by the formula $$RE_xA_{1-x}F_{2+x-2y}O_y$$

wherein RE represents a three-valent rare-earth element, A is alkaline earth, $0.002 \leq x \leq 0.20$, and $0 \leq y \leq x$; the particulate luminescent composition exhibiting a luminescence spectrum having a plurality of intensity peaks at characteristic wavelengths.

Further provided is a process comprising contacting a surface with a composition comprising
  a carrier liquid and a particulate luminescent composition dispersed therein, the particulate luminescent composition comprising a rare-earth-doped alkaline earth fluoride represented by the formula $$RE_xA_{1-x}F_{2+x-2y}O_y$$

wherein RE represents a three-valent rare-earth element, A is alkaline earth, $0.002 \leq x \leq 0.20$, and $0 \leq y \leq x$; the particulate luminescent composition exhibiting a luminescence spectrum having a plurality of intensity peaks at characteristic wavelengths, thereby forming upon the surface a coating comprising the composition.

Further provided is an article having a surface, the surface having disposed upon it a coating comprising a particulate luminescent composition, the particulate luminescent composition comprising a rare-earth-doped alkaline earth fluoride represented by the formula $$RE_xA_{1-x}F_{2+x-2y}O_y$$

wherein RE represents a three-valent rare-earth element, A is alkaline earth, $0.002 \leq x \leq 0.20$, and $0 \leq y \leq x$; the particulate luminescent composition exhibiting a luminescence spectrum having a plurality of intensity peaks at characteristic wavelengths.

DETAILED DESCRIPTION

Suitable for the practice of the present invention are particulate luminescent compositions comprising a compound represented by the formula $$RE_xA_{1-x}F_{2+x-2y}O_y$$

wherein RE represents a three-valent rare-earth element, A is alkaline earth, $0.002 \leq x \leq 0.20$, and, $0 \leq y \leq x$, said composition being characterized by a luminescence spectrum.

When each compound represented by the formula $$RE_xA_{1-x}F_{2+x-2y}O_y$$

wherein RE represents a three-valent rare-earth element, A is alkaline earth, $0.002 \leq x \leq 0.20$, and, $0 \leq y \leq x$ that has been synthesized at a temperature below about 100° C. is subject to heating in the presence of oxygen in the temperature range from 200-900° C., referred to as a particulate luminescent composition, it gives rise to a family of novel rare-earth-doped alkaline earth fluorides that are characterized by changing luminescence peak intensity ratios. One member of each family of compositions according to the present invention is a composition that has been synthesized at a temperature below 100° C. and has not been subject to a temperature above 100° C. This composition is referred to as the "first reference composition." A second member of each family is a composition that has been synthesized at room temperature and then heated to 900° C. for six hours. This composition is referred to as the "second reference composition." Each family of compositions is characterized by one rare earth ion, one alkaline earth ion, and one value of x.

It is found that the first reference compositions are characterized by $y/x<0.050$ whereas the particulate luminescent compositions are characterized by $0.05 \leq y/x \leq 1$. That is, upon heating to a temperature in the range of 200-900° C., the value of y in the reference composition is observed to increase.

Every member of each such family of compositions exhibits a luminescence spectrum having a plurality of intensity peaks at characteristic wavelengths. For each family of compositions, there exists at least one pair of the peaks at different wavelengths, the relative intensities are expressed as the "peak intensity ratio", changes depending upon the temperature/time profile to which the as-synthesized first reference composition has been subject. The particulate luminescent compositions are characterized by at least one peak intensity ratio that is at least 5% greater than the corresponding peak intensity ratio of the corresponding first reference composition, and that is at least 5% less than the corresponding peak intensity ratio of the corresponding second reference composition. The term "corresponding reference compositions" refers to the first and second reference compositions that are members of the same family of compositions as the heated composition to which they are being compared. The term "corresponding peak intensity ratio" refers to the peak intensity ratio of the same peaks in the corresponding reference composition as that of the peaks in the heated composition to which peak intensity ratio is being compared.

In one embodiment, the particulate luminescent composition is a composition represented by the formula $$Tb_{0.02}Sr_{0.98}F_{2.02-2y}O_y$$

where y is as defined, supra.

In a further embodiment of the particulate luminescent composition is a composition represented by the formula $$Eu_{0.02}Ca_{0.98}F_{2.02-2y}O_y$$

where y is as defined, supra.

Other embodiments include but are not limited to particulate luminescent compositions comprising rare-earth-doped alkaline earth fluorides represented by the formulae $Eu_{0.05}Sr_{0.95}F_{2.05-2y}O_y$, $Tb_{0.20}Ca_{0.80}F_{2.20-2y}O_y$, and so forth, where y is as defined above.

For the purposes of the present invention, a family of compositions is one in which all members have the same rare-earth element at the same molar concentration, x, the same alkaline earth element at the same concentration, 1−x, fluoride and oxygen, and wherein members are usually differentiated from one another in y as well as by the relative peak intensity ratio of at least one pair of luminescence peaks.

While the discussion herein is directed to the preparation of certain particulate luminescent compositions suitable for the practice of the present invention by heating the as-synthesized reference composition to a temperature in the range of 200-900° C., with the proviso that the duration of heating not exceed six hours at 900° C., the compositions themselves, characterized by variations in at least one luminescence peak intensity ratio, are not limited to any particular process by which they are prepared. Regardless of how the particulate luminescent compositions suitable for the practice of the invention are prepared, there will always be corresponding compositions that meet the limitations of the first and second reference compositions as herein defined.

For the purposes of the present invention, the term "carrier matrix" refers to a continuous medium within which the particulate luminescent composition is dispersed. The carrier matrix can comprise a liquid, a polymer or both.

In one embodiment, the present invention provides a composition comprising a carrier matrix and a particulate luminescent composition dispersed within the carrier matrix, the particulate luminescent composition comprising a rare-earth-doped alkaline earth fluoride represented by the formula $$RE_xA_{1-x}F_{2+x-2y}O_y$$

wherein RE represents a three-valent rare-earth element, A is alkaline earth, $0.002 \leq x \leq 0.20$, and $0 \leq y \leq x$; the particulate luminescent composition exhibiting a luminescence spectrum having a plurality of intensity peaks at characteristic wavelengths; and wherein the carrier matrix comprises a liquid. This embodiment represents a coatable composition such as an ink suitable for, e.g., printing onto the surface of an article to be marked for identification purposes.

In a further embodiment, the carrier matrix further comprises a polymer. In a still further embodiment, the polymer is dissolved in the liquid; that is, the carrier matrix is a polymer solution.

In another embodiment, the present invention provides a composition comprising a carrier matrix and a particulate luminescent composition dispersed within the carrier matrix, the particulate luminescent composition comprising a rare-earth-doped alkaline earth fluoride represented by the formula $$RE_xA_{1-x}F_{2+x-2y}O_y$$

wherein RE represents a three-valent rare-earth element, A is alkaline earth, $0.002 \leq x \leq 0.20$, and $0 \leq y \leq x$; the particulate luminescent composition exhibiting a luminescence spectrum having a plurality of intensity peaks at characteristic wavelengths; and wherein the carrier matrix consists essentially of a polymer. This embodiment represents the composition of the invention in the form of a dried coating comprising a polymer binder and the particulate luminescent composition dispersed therein.

In a further embodiment, at least one pair of the intensity peaks at different wavelengths in the luminescence spectrum of the particulate luminescent compound exhibits a peak intensity ratio that is at least 5% greater than the corresponding peak intensity ratio of the corresponding first reference composition, and that is also at least 5% less than the corresponding peak intensity ratio of the corresponding second reference composition.

Additional ingredients such as electrolytes, humectants, and other additives also can be present without substantively altering the operability of the invention.

In one embodiment of the particulate luminescent composition, RE is $Eu^{+3}$. In another embodiment, RE is $Tb^{+3}$. In still another embodiment, RE is $Er^{+3}$. In one embodiment of the composition of the invention, A is $Ca^{+2}$. In another embodiment, A is $Sr^{+2}$. In still another embodiment, A is $Ba^{+2}$. In one embodiment of the composition $0.01 \leq x \leq 0.10$. More specifically, x=0.02. In another embodiment, x=0.05. In still another embodiment x=0.10, and in a still further embodiment, x=0.20.

The specific wavelengths of the peaks from which the at least one peak intensity ratio is determined for any particular particulate luminescent composition depend upon the specific rare-earth element employed, and to a lesser degree to the host lattice—whether $CaF_2$, $SrF_2$, or $BaF_2$.

One method for the preparation of the first reference compound is the process conducted in fully aqueous solution described in co-pending U.S. application 60/687646 which is incorporated herein by reference to the entirety. After drying, the synthesis process results in a powder, or fine particulate, form of the rare-earth doped alkaline earth fluoride.

The prepared first reference compound can then be heated to prepare additional members of the compositional family. Any means employed for heating is satisfactory. Suitable means for heating include but are not limited to pressure vessel heating of an aqueous dispersion (so-called hydrothermal heating), electrical resistance furnaces, oil baths, electrically heated crucibles, liquid metal baths, lasers, radio frequency induction furnaces, microwave cavities, gas fired furnaces, oil fired furnaces, and solar furnaces. Preferred is an electrical resistance furnace. Typically, when heated in a bath, the as-synthesized powder is sealed in a pressure vessel of sufficient volume to leave a head-space comprising oxygen followed by immersion of the pressure vessel into the heating bath. When the as-synthesized powder is subject to oven or furnace heating it can be heated in an open crucible.

It has been found satisfactory to place the specimen to be heated into a furnace at room temperature, and then to heat to the desired end-point at a rate of 2-10° C./minute.

Heating is effected in the presence of oxygen. There are many potential sources for the oxygen. Heating can be effected in the air, or in an oxygen atmosphere. It is also possible for oxygen to be devolved from species employed or derived from the synthesis environment such as nitrates or hydoxyls. It is believed that even small amounts of oxygen contamination can be sufficient to effect the process.

The particles of starting material will undergo some degree of sintering or agglomeration during heating, particularly at the higher temperatures in the temperature range. Depending upon the particular exigencies of the end use intended, it can be desirable to subject the heated product to a means for comminution to smaller size. So called media milling is one such method for reducing and/or homogenizing the particle size. Another common method employed in the ink industry is known as mulling. Numerous other methods are known in the art.

Numerous formulations are known in the art for preparing inks, paints, varnishes and other coatable compositions. Every such composition in the art that contains inorganic pigments in particulate form can be employed to formulate the ink, paint, or other coatable composition of the present invention where the particulate luminescent composition serves as the pigment. The particulate luminescent composition may serve as the only pigment, or it may be combined with other pigments and particulate matter such as is known in the art of inks and coatings. In one embodiment, a rare-earth-doped alkaline earth fluoride is incorporated into an ink or coating with no other pigment, resulting in a luminescent coating that after application to the surface of an article is largely invisible until subject to UV excitation of luminescence.

The particulate luminescent composition suitable for use in the present invention is not limited by the manner in which it is prepared or the specific form thereof. In one embodiment, the composition is a coatable composition suitable for use in the preparation of a coating on a substrate. The coating so produced, a further embodiment, can be of any form. It can be in the form of a pattern such as printed text or other images, or it can be a coating of uniform thickness and appearance over a large area, such as a painted wall. While it is anticipated that the composition of the invention will find its greatest utility in the area of security markers or anti-counterfeiting, the composition can be employed for any purpose where luminescence, particularly at visible wavelengths, would be beneficial. For example, spray-coating or dip-coating exterior or interior automobile parts to create unusual visual effects in the appearance of the car.

Suitable carrier liquids include but are not limited to water, alkanes such as hexane; alcohols; aldehydes; ketones; ethers, such as dipropylene glycol monomethyl ether; esters, such as ethyl acetate, propyl acetate, or dipropylene glycol monomethyl ether acetate; nitrites, amides, aromatics such as toluene; and mixtures thereof. Water and alcohols are preferred. In one embodiment, methanol, ethanol, propanols, butanols, or mixtures thereof are employed. In another embodiment, water is employed. In a further embodiment, a mixture of alcohol and water is used as the carrier liquid.

In an ink embodiment according to the invention, the carrier liquid is used in an amount of about 15% by weight to about 90% by weight, preferably in an amount of about 30% by weight to about 60% by weight of the composition.

The coatable compositions exhibit a desirable balance among viscosity, solubility, compatibility of components, and wettability of the substrate. When the coatable composition is an ink useful in printing operations, electrostatic ink deposition methods require that resistivity and polarizability also be considered. Further, coatings, especially inks, are quick-drying and smear resistant, and resist abrasion.

Useful polymers for coatable compositions in which the carrier liquid is aqueous include, but are not limited to poly(ethylene oxide)s, poly(acrylamide)s, poly(vinylpyrrolidone)s, poly(vinyl alcohol)s and poly(vinyl acetate)s. Included in each of these terms are both homo- and copolymers of the primary monomers, as well as mixtures thereof.

With non-polar carrier liquids such as alkanes, suitable polymers include, but are not limited to cellulosic polymers, and poly(alpha-olefins) where the olefins contain six or more carbon atoms when used in conjunction with non-polar solvents such as alkanes. With polar organic carrier liquids such as esters, ketones, and glycol- and other ethers, suitable polymers include, but not limited to acrylics. Suitable solvent esters include but are not limited to ethyl acetate, butyl acetate, butyl cellosolve acetate, and carbitol esters. Suitable solvent ketones include but are not limited to acetone, methylethylketone, diisopropylketone, and cyclohexanone. Suitable solvent ethers include but are not limited to tetrahydrofuran, dioxane, and tetrahydrofurfural alcohol.

Other useful carrier liquids include terpineol, toluene, xylene, dimethylformamide, pyridine, ethylbenzene, carbon disulfide, 1-nitropropane, and tributylphosphate.

Mixtures of polymers are also suitable. Mixtures of polymers often provide a more desirable combination of properties than can be obtained from a single polymer.

Preferably the polymer is soluble in the carrier liquid. However, the polymer can be present as a dispersion in the carrier liquid as well.

One fundamental requirement for the polymer employed herein is that the polymer can not exhibit significant absorbance at either the excitation or emission wavelengths of interest because of interference with the intensity of the observed luminescence.

In an ink embodiment of the present invention, the polymer is employed in an amount of from 0% to about 15% by weight of the ink composition, preferably, about 2% to about 10%. Excessive amount of the polymer can adversely affect the viscosity of the ink composition.

For some printing applications, such as xerography and ink jet, electrical resistivity can be an important property. In those applications, the composition of the present invention can further comprise an electrolyte to obtain the desired electrical resistivity of the ink composition. Any suitable electrolyte known to those of ordinary skill in the art can be used. Suitable electrolytes include but are not limited to alkali and alkaline earth metal salts such as lithium nitrate, lithium chloride, lithium thiocyanate, sodium chloride, potassium chloride, potassium bromide, calcium chloride, and amine salts such as ammonium nitrate, ammonium chloride, dimethylamine hydrochloride, and hydroxylamine hydrochloride. It is important that the electrolyte salt not interfere with the luminescence.

The electrolyte is preferably present in the ink composition in the range of from about 0.1% to about 2%, more preferably 0.4% to 0.6%, by weight of the ink composition.

The coatable composition can further comprise a pH adjusting agent if needed to enhance the dissolution of the binder resin, or improve compatibility with the surface. The desired pH will be dependent upon the particular solvent used and also to some extent upon the other components employed. Any suitable pH adjusting agent, acid or base, can be used so as to maintain the pH of the ink composition in the range of from about 4.0 to about 8.0, preferably in the range of from about 4.5 to about 7.5.

The ink composition can further comprise a humectant when the liquid is water in order to prevent drying of the ink during the printing operation, as well as during storage of the ink. Humectants are hydrophilic solvents preferably having boiling points in the range of from about 1500° C. to about 250° C. Any suitable humectant known to those of ordinary skill in the art can be used. Examples of suitable humectants include glycols such as ethylene glycol, propylene glycol, glycerin, diglycerin, diethylene glycol, and the like, glycol ethers such as ethylene glycol dimethyl ether, ethylene glycol diethylether, cellosolve, diethylene glycol monoethylether (Carbitol), diethylene glycol dimethylether, and diethylene glycol diethylether, dialkylsulfoxides such as dimethylsulfoxide, and other solvents such as sulfolane, N-methylpyrrolidinone, and the like. Preferred humectants include propylene glycol and diethyleneglycol monoethylether.

Any suitable amount of the humectant can be used, preferably in an amount of from about 0.5% by weight to about 5% by weight of the ink composition, and more preferably in the amount of from about 1% by weight to about 3% by weight of the ink composition. Excessive use of the humectant is to be avoided because it will increase the toxicity and/or the viscosity of the ink.

The ink composition can further comprise a suitable biocide to prevent growth of bacteria, mold or fungus. Any suitable biocide can be used. DOWICIL™ 150, 200, and 75, benzoate salts, sorbate salts, and the like, methyl p-hydroxybenzoate, and 6-acetoxy-2,2-dimethyl-1,3-dioxane are examples of suitable biocides. The biocide can be present in the ink of the instant invention in the range of from about 0.05% by weight to about 0.5% by weight, preferably in the amount of from about 0.1% by weight of to about 0.3% by weight of the jet ink composition.

The ink composition can further comprise a defoamer to prevent foaming of the ink during its preparation, as well as during the printing operation. Any suitable defoamer known to those of ordinary skill in the art can be used. Preferred are defoamers that are miscible with the liquid. Suitable defoamers include silicone defoamers and acetylenic defoamers. The amount used is preferably in the range of from about 0.01% by weight to about 1% by weight of the ink composition, and more preferably in the range of from about 0.05% by weight to about 0.35% by weight of the ink composition. The weight percentages given above refer to that of the active ingredient, and if the defoamer is sold in a diluted form, the amount of the diluted defoamer used will be proportionately increased. Excessive use of the defoamers is to be avoided because it can adversely affect the print quality such as adhesion to the coated substrate.

The ink composition can be printed on any suitable substrate including papers, including coated papers, plastics, leather goods, fabrics, polymeric films, glass, ceramics, metals, and so forth.

To prepare an ink suitable for use in this invention, the particulate luminescent composition can be dispersed in the carrier liquid using a media mill, sand mill, high speed disperser, mulling plates or other means known in the art. The dispersion so produced should contain 10%-70% by weight, preferably 40% -60% by weight, of the particulate luminescent composition. A dispersing aid can be added equal to ½ to ¹⁄₁₀, preferably ¼ to ⅕, the weight of the particles, and the remainder should be the liquid carrier or mixture of suitable liquids.

When milling or mulling, dispersion and comminution occur simultaneously.

In general, a preferred ink formulation is prepared by combining a liquid carrier, a polymeric binder soluble therein, and the particulate luminescent composition so that the resulting composition contains 10-70% by weight, preferably 40-60%, of the particles, 0-15% by weight, preferably 2-10%, of polymer dissolved in the solvent, and 15-90%, preferably 30-60% by weight of the carrier liquid. Optionally the composition can contain plasticizer of 0 to 5% and dispersant of 0 to 8%. The ingredients can be combined in any order. The polymer can first be dissolved in the solvent followed by addition of the particulate material which is then dispersed therein; the particulate material so added can be in the form of dry particles or a pre-prepared particle dispersion. Alternatively, the particle dispersion can be prepared first followed by addition and dissolution of the polymer.

Varnishes according to the present invention may be formulated by adapting conventional methods known in the art. In a typical formulation, the particulate luminescent compound is combined in a viscous polymer solution consisting of ca. 10% of a fugitive solvent. Varnishes are conventionally applied by brushing, rolling, and spraying.

Further provided is a process comprising contacting a surface with a composition comprising
a carrier liquid, and a particulate luminescent composition dispersed therein, the particulate luminescent composition comprising a rare-earth-doped alkaline earth fluoride represented by the formula $$RE_xA_{1-x}F_{2+x-2y}O_y$$

wherein RE represents a three-valent rare-earth element, A is alkaline earth, $0.01 \leq x \leq 0.20$, and $0 \leq y \leq x$; the particulate luminescent composition exhibiting a luminescence spectrum having a plurality of intensity peaks at characteristic wavelengths.

thereby forming upon the surface a coating comprising the composition; and, extracting the carrier liquid from the coating.

In a further embodiment, at least one pair of the intensity peaks at different wavelengths in the luminescence spectrum of the particulate luminescent compound exhibits a peak intensity ratio that is at least 5% greater than the corresponding peak intensity ratio of the corresponding first reference composition, and that is also at least 5% less than the corresponding peak intensity ratio of the corresponding second reference composition.

According to the process of the invention, the composition of the invention can be applied to a surface in any manner consistent with the viscosity and specific constitution of the composition, and suitable for the particular surface to be coated. The composition can be applied in the form of a paint: brushed on, rolled on, or sprayed on. An article can be dip-coated into the composition, or the composition can be applied to a substrate by solution casting and drawn-down, or melt-casting. All such methods are well-known in the art.

In one embodiment of the particulate luminescent composition, RE is $Eu^{+3}$. In another embodiment, RE is $Tb^{+3}$. In still another embodiment, RE is $Er^{+3}$. In one embodiment of the composition of the invention, A is $Ca^{+2}$. In another embodiment, A is $Sr^{+2}$. In still another embodiment, A is $Ba^{+2}$. In one embodiment of the composition $0.01 \leq x \leq 0.10$. more specifically, in one embodiment x=0.02. In another embodiment of the composition, x=0.05. In still another embodiment x=0.10, and in a still further embodiment, x=0.20.

The specific wavelengths of the peaks from which the at least one peak intensity ratio is determined for any particular particulate luminescent composition depend upon the specific rare-earth element employed, and to a lesser degree to the host lattice—whether $CaF_2$, $SrF_2$, or $BaF_2$. However, all the particulate luminescent compositions exhibit the same differentiating characteristic regarding peak intensity ratio changes.

The first and second reference compounds associated with each compositional family is suitable for use in the process of the present invention.

Carrier liquids suitable for use in the process of the invention include but are not limited to water, alkanes such as hexane; alcohols; aldehydes; ketones; ethers, such as dipropylene glycol monomethyl ether; esters, such as ethyl acetate, propyl acetate, or dipropylene glycol monomethyl ether acetate; nitrites, amides, aromatics such as toluene; and mixtures thereof. Water and alcohols are preferred. In one embodiment, methanol, ethanol, propanols, butanols, or mixtures thereof are employed. In another embodiment, water is employed. In a further embodiment, a mixture of alcohol and water is used as the carrier liquid.

Other useful carrier liquids falling outside these classes include terpineol, toluene, xylene, dimethylformamide, pyridine, ethylbenzene, carbon disulfide, 1-nitropropane, and tributylphosphate.

In one embodiment, the process of the invention is a printing process wherein the composition employed therein is an ink wherein the carrier liquid is used in an amount of from about 15% by weight to about 90% by weight, preferably in an amount of from about 30% by weight to about 60% weight of the composition.

Useful polymers for aqueous inks suitable for use in the printing embodiment of the process include, but are not limited to poly(ethylene oxide)s, poly(acrylamide)s, poly(vinylpyrrolidone)s, poly(vinyl alcohol)s and poly(vinyl acetate)s. Included in each of these terms are both homo- and copolymers of the primary monomers, as well as mixtures thereof.

Useful polymers for non-aqueous inks suitable for use in the printing embodiment of the process include, but are not limited to cellulosic polymers, poly(alpha-olefins) where the olefins contain six or more carbon atoms when used in conjunction with non-polar solvents such as alkanes; acrylic polymers when used in conjunction with polar organic solvents such as esters, ketones, and glycol- and other ethers. Esters include but are not limited to ethyl acetate, butyl acetate, butyl cellosolve acetate; carbitol esters; ketones include but are not limited to acetone, methylethylketone, diisopropylketone, and cyclohexanone. Ethers include but are not limited to tetrahydrofuran, dioxane, tetrahydrofurfural alcohol.

Mixtures of polymers are also suitable. Mixtures of polymers often provide a more desirable combination of properties than can be obtained from a single polymer.

Preferably the polymer is soluble in the carrier liquid. However, the polymer can be present as a dispersion in the carrier liquid as well.

One fundamental requirement for the polymer employed herein is that the polymer can not exhibit significant absorbance at either the excitation or emission wavelengths of interest because of interference with the intensity of the observed luminescence.

In an ink suitable for use in the printing embodiment of the process, the polymer is employed in an amount of from 0% to about 15% by weight of the ink composition, preferably, about 2% to about 10%. Excessive amount of the polymer can adversely affect the viscosity of the ink composition.

For some printing applications, such as xerography and ink jet, electrical resistivity can be an important property. In those applications, a suitable ink can further comprise an electrolyte to obtain the desired electrical resistivity particularly of an ink-jet composition. Any suitable electrolyte known to those of ordinary skill in the art can be used. Suitable electrolytes include but are not limited to alkali and alkaline earth metal salts such as lithium nitrate, lithium chloride, lithium thiocyanate, sodium chloride, potassium chloride, potassium bromide, calcium chloride, and the like, and amine salts such as ammonium nitrate, ammonium chloride, dimethylamine hydrochloride, hydroxylamine hydrochloride, and the like. It is important that the electrolyte salt not interfere with the luminescence.

The electrolyte is preferably present in the ink in the range of from about 0.1% to about 2%, more preferably 0.4% to 0.6%, by weight of the ink composition.

An ink suitable for use in the printing embodiment of the process can include a pH adjusting agent if needed to enhance the dissolution of the binder resin, or improve compatibility with the surface to be printed on. The desired pH will be dependent upon the particular solvent used and also to some extent upon the other components employed. Any suitable pH adjusting agent, acid or base, can be used so as to maintain the pH of the ink composition in the range of from about 4.0 to about 8.0, preferably in the range of from about 4.5 to about 7.5.

An ink suitable for use in the printing embodiment of the process can include a humectant when the liquid is water in order to prevent drying of the ink during the printing operation, as well as during storage of the ink. Humectants are hydrophilic solvents preferably having boiling points in the range of from about 150° C. to about 250° C. Any suitable humectant known to those of ordinary skill in the art can be used. Examples of suitable humectants include glycols such as ethylene glycol, propylene glycol, glycerin, diglycerin, diethylene glycol, and the like, glycol ethers such as ethylene glycol dimethyl ether, ethylene glycol diethylether, cellosolve, diethylene glycol monoethylether (Carbitol), diethylene glycol dimethylether, and diethylene glycol diethylether, dialkylsulfoxides such as dimethylsulfoxide, and other solvents such as sulfolane, N-methylpyrrolidinone, and the like. Preferred humectants include propylene glycol and diethyleneglycol monoethylether.

Any suitable amount of the humectant can be used, preferably in an amount of from about 0.5% by weight to about 5% by weight of the ink composition, and more preferably in the amount of from about 1% by weight to about 3% by weight of the ink composition. Excessive use of the humectant is to be avoided because it will increase the toxicity and/or the viscosity of the ink.

An ink suitable for use in the printing embodiment of the process can include a suitable biocide to prevent growth of bacteria, mold or fungus. Any suitable biocide can be used. DOWICIL™ 150, 200, and 75, benzoate salts, sorbate salts, and the like, methyl p-hydroxybenzoate, and 6-acetoxy-2,2-dimethyl-1,3-dioxane are examples of suitable biocides. The biocide can be present in the ink of the instant invention in the range of from about 0.05% by weight to about 0.5% by weight, preferably in the amount of from about 0.1% by weight of to about 0.3% by weight of the jet ink composition.

An ink suitable for use in the printing embodiment of the process can include a defoamer to prevent foaming of the ink during its preparation, as well as during the printing operation. Any suitable defoamer known to those of ordinary skill in the art can be used. Preferred are defoamers that are miscible with the liquid. Suitable defoamers include silicone defoamers and acetylenic defoamers. The amount used is preferably in the range of from about 0.01% by weight to about 1% by weight of the ink composition, and more preferably in the range of from about 0.05% by weight to about 0.35% by weight of the ink composition. The weight percentages given above refer to that of the active ingredient, and if the defoamer is sold in a diluted form, the amount of the diluted defoamer used will be proportionately increased. Excessive use of the defoamers is to be avoided because it can adversely affect the print quality such as adhesion to the coated substrate.

Printing can be effected on any suitable substrate including papers, including coated papers, plastics, leather goods, fabrics, polymeric films, glass, ceramics, metals, and so forth.

To prepare a suitable ink the particulate luminescent composition can be dispersed in the carrier liquid using a media mill, sand mill, high speed disperser, mulling plates or other means known in the art. The dispersion so produced should contain 10%-70% by weight, preferably 40%-60% by weight, of the particulate luminescent composition. A dispersing aid can be added equal to ½ to 1/10, preferably ¼ to ⅕, the weight of the particles, and the remainder should be the liquid carrier or mixture of suitable liquids.

When milling or mulling, dispersion and comminution occur simultaneously.

In general, an ink formulation is prepared by combining a liquid carrier, a polymeric binder soluble therein, and the particulate luminescent composition so that the resulting composition contains 10-70% by weight, preferably 40-60%, of the particles, 0-15% by weight, preferably 2-10%, of polymer dissolved in the solvent, and 15-90%, preferably 30-60% by weight of the carrier liquid. Optionally the composition can contain plasticizer of 0 to 5% and dispersant of 0 to 8%. The ingredients can be combined in any order. The polymer can first be dissolved in the solvent followed by addition of the particulate material which is then dispersed therein; the particulate material so added can be in the form of dry particles or a pre-prepared particle dispersion. Alternatively, the particle dispersion can be prepared first followed by addition and dissolution of the polymer.

Further provided according to the present invention is an article having a surface, the surface having disposed upon it a coating comprising a particulate luminescent composition, the particulate luminescent composition comprising a rare-earth-doped alkaline earth fluoride represented by the formula $$RE_xA_{1-x}F_{2+x-2y}O_y$$

wherein RE represents a three-valent rare-earth element, A is alkaline earth, $0.002 \leq x \leq 0.20$, and $0 \leq y \leq x$; the particulate luminescent composition exhibiting a luminescence spectrum having a plurality of intensity peaks at characteristic wavelengths.

In a further embodiment, at least one pair of the intensity peaks at different wavelengths in the luminescence spectrum of the particulate luminescent compound exhibits a peak intensity ratio that is at least 5% greater than the corresponding peak intensity ratio of the corresponding first reference composition, and that is also at least 5% less than the corresponding peak intensity ratio of the corresponding second reference composition. In one embodiment of the coated article, RE is $Eu^{+3}$. In another embodiment, RE is $Tb^{+3}$. In still another embodiment, RE is $Er^{+3}$. In one embodiment, A is $Ca^{+2}$. In another embodiment, A is $Sr^{+2}$. In still another embodiment, A is $Ba^{+2}$. In one embodiment $0.01 \leq x \leq 0.10$. More specifically, in one embodiment x=0.02. In another embodiment, x=0.05. In still another embodiment x=0.10, and in a still further embodiment, x=0.20.

The specific wavelengths of the peaks from which the at least one peak intensity ratio is determined for any particular particulate luminescent composition depend upon the specific rare-earth element employed, and to a lesser degree to the host lattice—whether $CaF_2$, $SrF_2$, or $BaF_2$. However, all the particulate luminescent compositions exhibit the same differentiating characteristic regarding peak intensity ratio changes.

Both the first and second reference compositions described supra are suitable for use in the coating hereof.

In a further embodiment, the coated article further comprises a polymer within which the particles of the particulate luminescent composition is dispersed, the polymer adhering to the surface of the article. Conventionally, a polymer serving that function is known as a binder polymer or binder resin.

Useful polymers for use in the coated article of the present invention include, but are not limited to poly(ethylene oxide)s, poly(acrylamide)s, poly(vinylpyrrolidone)s, poly(vinyl alcohol)s and poly(vinyl acetate)s. Included in each of these terms are both homo- and copolymers of the primary monomers. Also included are cellulosic polymers, poly(alpha-olefins) where the olefins contain six or more carbon atoms, and acrylic polymers.

Mixtures of polymers are also suitable. Mixtures of polymers often provide a more desirable combination of properties than can be obtained from a single polymer.

One fundamental requirement for the polymer employed herein is that the polymer can not exhibit significant absorbance at either the excitation or emission wavelengths of interest because of interference with the intensity of the observed luminescence.

The coated article can further comprise an electrolyte, a humectant, a pH adjusting agent, a defoamer, a plasticizer, a biocide, a dispersing aid or such other adjuvants that are commonly employed in the art of formulating inks and paints.

In general, a suitable coating for the article of the invention comprises 100 to 70 parts by weight of the particulate luminescent composition suitable for use herein, and 0 to 20 parts by weight of a suitable polymer. Optionally the composition can contain as much as circa 20 parts by weight of such other adjuvants as are recited above.

The coated article comprises any coatable surface, preferably any printable surface. Suitable coatable surfaces include but are not limited to metallic surfaces, such as automobile body parts, coins, paneling, and the like; ceramic surfaces, including glazed surfaces; glass; stone such as marble; molded plastic and fiberglass as in electronics housings and circuit boards, molded sheeting, polymeric films and the like; leather goods; fabrics; including textile goods, canvas, and the like; papers, including coated papers, including currencies, bonds, and other securities, contracts and the like.

EXAMPLES

General Method

Luminescence Spectra

The data were collected with a SPEX JY spectrofluorimeter equipped with the phosphorimeter option. Except where otherwise noted, the excitation wavelength was 394 nm (10 nm bandpass) and the pulse width was nominally 80 microseconds. Spectra were collected at 5 nm resolution with a 0.1 msec time delay after the excitation pulse to permit background fluorescence from the label substrates to decay. A 405 nm long-pass filter was used before the emission monochromator to eliminate second-order excitation light. Each spectrum was the average of 150 scans, each collected with one excitation pulse per 1 nm wavelength step. The detection time window was 10 msec.

Examples 1-6

23.143 g of $Ca(NO_3)_2 \cdot 4H_2O$ (Alfa Aesar, 99.98%) and 0.856 g of $Eu(NO_3)_3 \cdot 5H_2O$ (Sigma-Aldrich, 99.9%) were stirred into 250 ml of deionized water in a polycarbonate Erlenmeyer flask. Separately, 7.482 g of $NH_4F$ (Alfa Aesar, ASC reagent 99%) were dissolved by stirring into a further 250 ml aliquot of deionized water. Both solutions as prepared were stirred for about 5 minutes to ensure dissolution of the solids.

The prepared solutions were simultaneously but separately fed by a peristaltic pump at 10 ml/min through silicone rubber tubing into the two arms of a plastic T. Teflon® tubing ran from the leg or output branch of the T into the product flask. A precipitate formed within the output branch of the T immediately beyond the point at which the two streams merged, forming a suspension in the water. The suspension formed was discharged into the product flask. During the discharge the flask containing the product suspension was stirred by magnetic stirring. After discharge was complete, the suspension was held static for about 24 hrs at ambient temperature. The resulting suspension was then centrifuged (Sorvall RC5C, Thermo Electron Corp.) at a relative centrifugal force of 9500×g for 40 min, and the supernatant (containing soluble salts) decanted and discarded. The residue was redispersed in a fresh aliquot of about 400 ml of deionized water using ultrasonic agitation (Sonics and Materials, Inc, Danbury, Conn.) at 50 W/cm². The resulting dispersion was again centrifuged and the supernatant again decanted and discarded. The residue was redispersed as before, and the resulting suspension was dried in a laboratory drying oven at 60° C. in air for 24 hrs to form a dry powder.

Heating

The dried powder was then divided by visual estimation into about two equal aliquots. One aliquot was placed in a covered alumina crucible which in turn was placed into a Fisher Isotemp Programmable Ashing Furnace, Model 497, at room temperature. The specimen was then heated in air at a programmed rate of 5° C./min to 900° C., then held isothermally for 1 hr, followed by cooling at 5° C./min to room temperature.

The fired powder was hand ground using a mortar and pestle, then placed into a ceramic jar mill with ½" milling media. Isopropyl alcohol was added to fill the mill to approx. ⅔ full. The slurry was milled overnight. The milled slurry was placed into a disposable filter and the isopropyl alcohol was filtered off leaving the milled particles in the filter. The particles were air dried for 8 hrs. then placed in a 70 C oven to complete the drying process overnight.

Approximately 1 g of the powder: so prepared was combined with approximately 1 g of a solution of 10% ethyl cellulose and 90% 1-methyl-4-(1-methylvinyl) cyclohexanol (β-terpineol) on the bottom glass plate of a model M-5 Hoover Auto Muller (Hoover Color Corp., Irvingto, N.J.). Two pressure weight plates provided therewith were set in place over the combination and locked into place. Twenty rotations were performed after which the sample was re-spread on the glass plate using a spatula. 4-5 more cycles of twenty rotations were performed, in between each, the sample was re-spread with the spatula. The final product was a highly viscous paste.

The prepared paste was screen-printed on 6 examples of commercially available Ink Jet Labels (Avery Dennison Corp.) label stock using a 325 mesh screen in a Series L-400 screen printer (Engineered Technical Products, Somerville, N.J.). Three coats were applied to each label, to yield a coating weight of approximately 6 mg/cm² of the Eu-doped CaF2 in the screen-printed films. The films were heated to 110-125° C. for 10 minutes to evaporate any residual solvent.

The luminescence intensity ratio for the 592±2 nm, and 627±2 nm emission lines for all 6 films was measured as described supra, and the results are given in Table 1.

TABLE 1

Examples 1-6. Intensity ratios of screen printed samples

| Example | 592/627 |
|---|---|
| 1 | 4.68 |
| 2 | 4.64 |
| 3 | 4.80 |
| 4 | 4.73 |
| 5 | 4.86 |
| 6 | 4.87 |

Examples 7-9

The materials and procedures of Examples 1-6 were repeated. The ink paste so prepared was screen-printed in the manner of Examples 1-6 on 3 Avery labels upon which a bar-code had first been printed. Unlike in Examples 1-6 only one coat was applied to each label, to yield a coating weight of approximately 2 mg of the Eu-doped CaF2 in the screen-printed films. The films were heated to 110-125° C. for 10 minutes to evaporate any residual solvent.

The luminescence intensity ratio was then measured for the 592 nm, and 627 nm emission lines for all 3 films, and the results are given in Table 2.

TABLE 2

Examples 7-9

| Example | 592 nm/627 nm |
|---|---|
| 7 | 4.78 |
| 8 | 4.34 |
| 9 | 4.50 |

Examples 10-14

The preparative method and materials of Examples 1-6 were repeated except that after the second ultrasonically-driven redispersion the resulting suspension was not dried, but rather the resulting suspension was placed into a Teflon® PFA container which in turn was placed into a pressure vessel, and heated to 245° C. for 6 hrs. After the heating, the suspension was filtered through a 1.0 um syringe filter. The filtrate was redispersed in deionized water resulting in a suspension that was 5.73 wt. % solids.

The suspension so prepared was ink jetted as 2 cm×2 cm squares onto the surface of a paper or of a Mylar® (DuPont-Teijin Films, Wilmington, Del.) film using a Jetlab II Table-Top Printing Platform (Microfab Technologies, Inc. Plano, Tex.) equipped with a 50 micron nozzle and 1 mm work distance. A single coating layer consumed 0.5 microliters/cm$^2$ which at 5.73% solids comes to a dry weight of 29.8 micrograms/cm$^2$. As indicated in Table 3, coatings of up to 18 coats were prepared. The luminescence intensity ratio was determined as described supra for peaks at 591 nm, and 614 nm. The results are shown in Table 3.

TABLE 3

Ink-jetted samples

| Example | Number layers | 2% Eu CaF2 (mg/cm2) | Substrate | 591/614 |
|---|---|---|---|---|
| 10 | 12 | 0.3578 | paper | 1.38 |
| 11 | 15 | 0.4470 | paper | 1.82 |
| 12 | 18 | 0.5364 | paper | 1.45 |
| 13 | 15 | 0..4470 | Mylar ® | 2.23 |
| 14 | 12 | 0.3578 | Mylar ® | 2.20 |

What is claimed is:

1. A composition comprising a carrier matrix, and a particulate luminescent composition dispersed therein, the particulate luminescent composition comprising a rare-earth-doped alkaline earth fluoride represented by the formula $$RE_xA_{1-x}F_{2+x-2y}O_y$$

wherein RE represents a three-valent rare-earth element, A is alkaline earth, $0.002 \leq x \leq 0.20$, and $0 \leq y \leq x$; the particulate luminescent composition exhibiting a luminescence spectrum having a plurality of intensity peaks at characteristic wavelengths, wherein at least one pair of the intensity peaks at different wavelengths in the luminescence spectrum of the particulate luminescent compound exhibits a peak intensity ratio that is at least 5% greater than the corresponding peak intensity ratio of a corresponding first reference composition, and that is also at least 5% less than the corresponding peak intensity ratio of a corresponding second reference composition wherein the first corresponding reference composition has not been exposed to a temperature above 100° C. and the second corresponding reference composition has been subject to heating to 900° C. for 6 hours.

2. The composition of claim 1 wherein RE is selected from $Eu^{+3}$, $Tb^{+3}$ or $Er^{+3}$.

3. The composition of claim 1 wherein A is selected from $Sr^{+2}$, $Ca^{+2}$, or $Ba^{+2}$.

4. The composition of claim 1 wherein $0.01 \leq x \leq 0.10$.

5. The composition of claim 1 wherein the intensity ratios differ by at least 10%.

6. The composition of claim 1 wherein the carrier matrix comprises a liquid.

7. The composition of claim 6 wherein the liquid is water.

8. The composition of claim 1 wherein the carrier matrix comprises a polymer.

9. The composition of claim 8 wherein the polymer is dissolved in the liquid.

10. The composition of claim 8 wherein the polymer is ethyl cellulose.

11. A process comprising contacting a surface with a composition comprising a carrier matrix, and a particulate luminescent composition dispersed therein, the particulate luminescent composition comprising a rare-earth-doped alkaline earth fluoride represented by the formula $$RE_xA_{1-x}F_{2+x-2y}O_y$$

wherein RE represents a three-valent rare-earth element, A is alkaline earth, $0.002 \leq x \leq 0.20$, and $0 \leq y \leq x$; the particulate luminescent composition exhibiting a luminescence spectrum having a plurality of intensity peaks at characteristic wavelengths, wherein at least one pair of the intensity peaks at different wavelengths in the luminescence spectrum of the particulate luminescent compound exhibits a peak intensity ratio that is at least 5% greater than the corresponding peak intensity ratio of a corresponding first reference composition, and that is also at least 5% less than the corresponding peak intensity ratio of a corresponding second reference composition wherein the first corresponding reference composition has not been exposed to a temperature above 100° C. and the second corresponding reference composition has been subject to heating to 900° C. for 6 hours.

12. The process of claim 11 wherein RE is selected from $Eu^{+3}$, $Tb^{+3}$ or $Er^{+3}$.

13. The process of claim 11 wherein A is selected from $Sr^{+2}$, $Ca^{+2}$, or $Ba^{+2}$.

14. The process of claim 11 wherein $0.01 \leq x \leq 0.10$.

15. The process of claim 11 wherein the intensity ratios differ by at least 10%.

16. The process of claim 11 wherein the carrier matrix comprises a liquid.

17. The process of claim 16 wherein the liquid is water.

18. The process of claim 11 wherein the carrier matrix comprises a polymer.

19. The process of claim 18 wherein the polymer is dissolved in the liquid.

20. The process of claim 18 wherein the polymer is ethyl cellulose.

21. The process of claim 11 wherein the contacting is effected by printing.

22. The process of claim 21 wherein the printing is screen printing.

23. The process of claim 21 wherein the printing is ink jet printing.

24. An article having a surface, the surface having disposed upon it a coating comprising a particulate luminescent composition dispersed therein, the particulate luminescent composition comprising a rare-earth-doped alkaline earth fluoride represented by the formula $$RE_xA_{1-x}F_{2+x-2y}O_y$$

wherein RE represents a three-valent rare-earth element, A is alkaline earth, $0.002 \leq x \leq 0.20$, and $0 \leq y \leq x$; the particulate luminescent composition exhibiting a luminescence spectrum having a plurality of intensity peaks at characteristic wavelengths, wherein at least one pair of the intensity peaks at different wavelengths in the luminescence spectrum of the particulate luminescent compound exhibits a peak intensity ratio that is at least 5% greater than the corresponding peak intensity ratio of a corresponding first reference composition, and that is also at least 5% less than the corresponding peak intensity ratio of a corresponding second reference composition wherein the first corresponding reference composition has not been exposed to a temperature above 100° C. and the second corresponding reference composition has been subject to heating to 900° C. for 6 hours.

25. The article of claim 24 wherein the coating composition comprises a polymer.

26. The article of claim 24 wherein RE is selected from $Eu^{+3}$, $Tb^{+3}$ or $Er^{+3}$.

27. The article of claim 24 wherein A is selected from $Sr^{+2}$, $Ca^{+2}$, or $Ba^{+2}$.

28. The article of claim 24 wherein $0.01 \leq x \leq 0.10$.

29. The article of claim 24 wherein the intensity ratios differ by at least 10%.

30. The article of claim 25 wherein the polymer is ethyl cellulose.

* * * * *

UNITED STATES PATENT AND TRADEMARK OFFICE
CERTIFICATE OF CORRECTION

PATENT NO. : 7,704,599 B2
APPLICATION NO. : 11/749780
DATED : April 27, 2010
INVENTOR(S) : Michael Karl Crawford, Kurt Richard Mikeska and Changzai Chi It is certified that error appears in the above-identified patent and that said Letters Patent is hereby corrected as shown below:

Title Page

"(75) Inventors: Michael Karl Crawford, Glen Mills, PA (US);
　　　　　　　　Kurt Richard Mikeska, Hockessin, DE (US)"

should read

-- (75) Inventors: Michael Karl Crawford, Glen Mills, PA (US);
　　　　　　　　Kurt Richard Mikeska, Hockessin, DE (US);
　　　　　　　　Changzai Chi, Hockessin, DE (US) --

Signed and Sealed this
Eleventh Day of January, 2011

David J. Kappos
*Director of the United States Patent and Trademark Office*